United States Patent
Nii

(10) Patent No.: US 12,305,032 B2
(45) Date of Patent: May 20, 2025

(54) RESIN POWDER AND METHOD FOR PRODUCING SAME

(71) Applicant: KURARAY CO., LTD., Kurashiki (JP)

(72) Inventor: Shinsuke Nii, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 659 days.

(21) Appl. No.: 17/630,823

(22) PCT Filed: Jul. 27, 2020

(86) PCT No.: PCT/JP2020/028614
§ 371 (c)(1),
(2) Date: Jan. 27, 2022

(87) PCT Pub. No.: WO2021/020323
PCT Pub. Date: Feb. 4, 2021

(65) Prior Publication Data
US 2022/0275191 A1    Sep. 1, 2022

(30) Foreign Application Priority Data

Jul. 30, 2019 (JP) .................. 2019-140281

(51) Int. Cl.
| | |
|---|---|
| *C08L 29/04* | (2006.01) |
| *B29B 9/02* | (2006.01) |
| *B29B 9/12* | (2006.01) |
| *B29B 9/16* | (2006.01) |
| *C08F 8/12* | (2006.01) |
| *C08F 216/06* | (2006.01) |
| *C08J 3/12* | (2006.01) |

(52) U.S. Cl.
CPC ............... *C08L 29/04* (2013.01); *B29B 9/12* (2013.01); *B29B 9/16* (2013.01); *C08J 3/12* (2013.01); *C08J 3/124* (2013.01); *B29B 9/02* (2013.01); *B29B 2009/125* (2013.01); *B29B 2009/166* (2013.01); *C08F 8/12* (2013.01); *C08F 216/06* (2013.01); *C08J 2329/04* (2013.01)

(58) Field of Classification Search
CPC ......... C08L 29/04; C08J 3/12; C08J 2329/04; C08J 3/124; B29B 9/02; B29B 9/16; B29B 2009/125; B29B 2009/166; B29B 9/12; C08F 8/12; C08F 216/06
See application file for complete search history.

(56) References Cited

U.S. PATENT DOCUMENTS

2009/0246166 A1    10/2009    Shibutani et al.

FOREIGN PATENT DOCUMENTS

| CN | 107266838 A | 10/2017 | |
| CN | 109988323 A | 7/2019 | |
| JP | 2006-205071 A | 8/2006 | |
| JP | 2009-256641 A | 11/2009 | |
| JP | 2016-209836 A | 12/2016 | |
| JP | 2019-11282 A | 1/2019 | |
| TW | 201136833 A | * 11/2011 | ............. A61K 6/007 |
| WO | WO 2015/186745 A1 | 12/2015 | |

OTHER PUBLICATIONS

International Search Report mailed on Oct. 6, 2020 in PCT/JP2020/028614 filed on Jul. 27, 2020, 2 pages).
Extended European Search Report issued Jul. 11, 2023, in corresponding European Patent Application No. 20846314.1, 5 pages.

* cited by examiner

*Primary Examiner* — Rabon A Sergent
(74) *Attorney, Agent, or Firm* — Oblon, McClelland, Maier & Neustadt, L.L.P.

(57) ABSTRACT

A resin powder may be superior in passability through pipes and silos, and a method may produce such a resin powder. The resin powder contains a vinyl alcohol polymer, an average particle diameter thereof is 100 to 2,000 μm, and an average value PA of a roundness P by formula (1), of 50 particles arbitrarily extracted from the particles of the resin powder having a particle diameter of 100 to 1,000 μm, is 0.1 to 0.8.

$$P=(\Sigma_{i=1}^{N} r_i)/NR \qquad (1)$$

$r_i$ being a radius of curvature of each particle corner of the 50 particles; R being a maximum inscribed circle radius of the particle; and N being a number of particle corners. If the number of particle corners is 9 or more, the radii of curvature of eight corners, in increasing order from a smallest radius of curvature, are adopted, and N is 8.

20 Claims, No Drawings

RESIN POWDER AND METHOD FOR PRODUCING SAME

CROSS-REFERENCE TO RELATED APPLICATIONS

The present application is the national stage of international application PCT/JP2020/028614, filed on Jul. 27, 2020, and claims the benefit of the filing date of Japanese Appl. No. 2019-140281, filed on Jul. 30, 2019.

TECHNICAL FIELD

The present invention relates to a resin powder and a method for producing the same.

DISCUSSION OF THE BACKGROUND

Polyvinyl alcohol polymers (hereinafter, may be also referred to as "PVAs") are synthetic resins obtained by saponifying a polyvinyl ester. PVAs are water soluble, and are adopted for use in synthetic fiber materials, film materials, emulsification dispersants, adhesives, and the like.

Resin powders containing PVAs are typically obtained by, e.g., grinding a PVA solid obtained by saponification. For example, in Patent Document 1, a PVA powder is obtained in which a particle diameter is controlled by altering the size of a sieve on an outlet of a grinder.

PRIOR ART DOCUMENTS

Patent Documents

Patent Document 1: PCT International Publication No. 2015/186745

SUMMARY OF THE INVENTION

Problems to be Solved by the Invention

In factories and the like, resin powders are subjected to transportation through pipes, packing through silos, and the like. However, in carrying out such operations, there are cases in which resin powders containing PVAs become clogged in the pipes, silos, and the like. In the case of resin powders containing PVAs, perhaps due to water solubility, hygroscopicity, and the like of the PVAs, such clogging is particularly likely to occur in highly humid environments.

The present invention was made in view of the foregoing circumstances, and an object of the invention is to provide a resin powder which is superior with regard to passability through pipes, silos, and the like, and a method for producing such a resin powder.

Means for Solving the Problems

The aforementioned problems are solved by the following.

[1] A resin powder consisting of particles, wherein
the resin powder contains a vinyl alcohol polymer,
an average particle diameter thereof is 100 to 2,000 μm, and
an average value PA of a roundness P, represented by the following formula (1), of 50 particles arbitrarily extracted from the particles of the resin powder which have a particle diameter of 100 to 1,000 μm is 0.1 to 0.8:

$$P = \left( \sum_{i=1}^{N} r_i \right) / NR \qquad (1)$$

wherein, in the formula (1), $r_i$ represents a radius of curvature of each corner of a particle of the 50 particles arbitrarily extracted; R represents a radius of a maximum inscribed circle of the particle; and N is the number of corners of the particle, wherein in a case in which the number of corners of the particle is 9 or more, the radii of curvature of eight corners, in increasing order from a smallest radius of curvature, are adopted, and N is set to 8.

[2] The resin powder according to [1], wherein the vinyl alcohol polymer has a viscosity-average degree of polymerization of 200 to 5,000, and a degree of saponification of 35 to 99.99 mol %.

[3] The resin powder according to [1] or [2], wherein the following inequality (2) is satisfied, and the average particle diameter is 100 to 1,000 μm:

$$PA \times S \geq 18 \qquad (2),$$

wherein in the inequality (2), S represents a degree of saponification (mol %) of the vinyl alcohol polymer.

[4] The resin powder according to any one of [1] to [3], wherein a percentage content of particles which have a particle diameter of 100 to 1,000 μm is 50% by mass or more.

[5] A method for producing the resin powder according to any one of [1] to [4], the method including:
grinding a resin solid comprising the vinyl alcohol polymer to obtain a coarse powder, and
processing surfaces of the coarse powder.

Effects of the Invention

According to the prevent invention, a resin powder which is superior with regard to passability through pipes, silos, and the like, and a method for producing such a resin powder can be provided.

DESCRIPTION OF EMBODIMENTS

Resin Powder

One embodiment of the present invention is a resin powder consisting of particles, wherein the resin powder contains a vinyl alcohol polymer (PVA: polyvinyl alcohol), an average particle diameter thereof is 100 to 2,000 μm, and an average value PA of a roundness P (hereinafter, may be also referred to as "average roundness") of 50 particles arbitrarily extracted from particles which have a particle diameter of 100 to 1,000 μm is 0.1 to 0.8, wherein P is represented by the following formula (1).

It is to be noted that herein, numerical value ranges described using the term "to" mean that the numerical values provided before and after the term "to" are respectively included as the lower limit and the upper limit.

Due particularly to the average roundness falling within the range specified above, compared to conventional resin powders, the resin powder of the one embodiment of the present invention is less likely to generate a resin powder clog in pipes and/or silos when performing transportation through pipes, packing through silos, and the like. Although not necessarily clarified and without wishing to be bound by any theory, the reason for this effect is presumed to be that by virtue of each particle having rounded corners, friction upon the particles coming into contact with each other and friction upon the particles coming into contact with a wall surface are low, and as a result, flowability of the particles is improved.

The PVA is typically a principal component of the resin powder of the one embodiment of the present invention. It is to be noted that the "principal component" as referred to herein means the component having the highest content on a mass basis. The lower limit of a content of nonvolatile components of the resin powder of the one embodiment of the present invention accounted for by the PVA is preferably 50% by mass, more preferably 70% by mass, and still more preferably 90% by mass, and may be even more preferably 99% by mass. The content of the nonvolatile components of the resin powder of the one embodiment of the present invention accounted for by the PVA may be 100% by mass. The nonvolatile components other than the PVA which may be contained in the resin powder of the one embodiment of the present invention are exemplified by additives such as resins other than the PVA, and surfactants and plasticizers; various compounds used during production; and the like. Furthermore, a content of volatile components in the resin powder of the one embodiment of the present invention is typically 20% by mass or less, and is preferably 15% by mass or less, and more preferably 10% by mass or less. The volatile components which may be contained in the resin powder of the one embodiment of the present invention are exemplified by alcohols, water, and the like.

The PVA is a polymer having vinyl alcohol units as monomer units. The PVA is typically obtained by saponifying a polyvinyl ester. The lower limit of a proportion of total monomer units in the PVA accounted for by the vinyl alcohol units is preferably 35 mol %, more preferably 50 mol %, and still more preferably 70 mol %, and may be even more preferably 80 mol % or 90 mol %. When the proportion of the vinyl alcohol units is equal to or more than the lower limit, the passability particularly in an environment having high humidity increases, and efficient production of the resin powder of the one embodiment of the present invention is facilitated by a production method involving grinding and surface processing. On the other hand, the upper limit of the proportion accounted for by the vinyl alcohol units may be 100 mol %, and is preferably 99.99 mol %, and more preferably 99 mol %.

The lower limit of a degree of saponification of the PVA is preferably 35 mol %, more preferably 50 mol %, and still more preferably 70 mol %, and may be even more preferably 80 mol % or 90 mol %. When the degree of saponification is equal to or more than the lower limit, the passability particularly in an environment having high humidity increases, and efficient production of the resin powder of the one embodiment of the present invention is facilitated by a production method involving grinding and surface processing. On the other hand, the upper limit of the degree of saponification may be 100 mol %, and is preferably 99.99 mol %, and more preferably 99 mol %. The degree of saponification is a value measured according to a procedure described in JIS K6726: 1994.

The PVA may have an other monomer unit aside from the vinyl alcohol units and vinyl ester units. Examples of a monomer that gives the other monomer unit include: α-olefins such as ethylene, propylene, 1-butene, isobutene, and 1-hexene; acrylic acid and methacrylic acid; acrylic acid esters such as methyl acrylate and ethyl acrylate; methacrylic acid esters such as methyl methacrylate and ethyl methacrylate; acrylamide derivatives such as N-methylacrylamide and N-ethylacrylamide; methacrylamide derivatives such as N-methylmethacrylamide and N-ethylmethacrylamide; vinyl ethers such as methyl vinyl ether, ethyl vinyl ether, n-propyl vinyl ether, isopropyl vinyl ether, and n-butyl vinyl ether; hydroxy group-containing vinyl ethers such as ethylene glycol vinyl ether, 1,3-propanediol vinyl ether, and 1,4-butanediol vinyl ether; allyl acetate; allyl ethers such as propyl allyl ether, butyl allyl ether, and hexyl allyl ether; oxyalkylene group-containing monomers; isopropenyl acetate; hydroxy group-containing α-olefins such as 3-buten-1-ol, 4-penten-1-ol, 5-hexen-1-ol, 7-octen-1-ol, 9-decen-1-ol, and 3-methyl-3-buten-1-ol; silyl group-containing monomers such as vinyltrimethoxysilane, vinylmethyldimethoxysilane, vinyldimethylmethoxysilane, vinyltriethoxysilane, vinylmethyldiethoxysilane, vinyldimethylethoxysilane, 3-(meth)acrylamide propyltrimethoxysilane, and 3-(meth)acrylamide propyltriethoxysilane; and the like. Of these, the α-olefins, acrylic acid, methacrylic acid, the acrylic acid esters, and the methacrylic acid esters are preferred.

A proportion of the total monomer units in the PVA accounted for by the other monomer units may be preferably 20 mol % or less, and may be more preferably 10 mol % or less. On the other hand, the proportion accounted for by the other monomer units may be, for example, 0.1 mol % or more, or may be 1 mol % or more.

The viscosity-average degree of polymerization of the PVA is not particularly limited, and is preferably 200 or more, more preferably 250 or more, still more preferably 400 or more, and particularly preferably 600 or more. The viscosity-average degree of polymerization is preferably 5,000 or less, more preferably 4,500 or less, and still more preferably 3,500 or less. When the viscosity-average degree of polymerization falls within the above range, industrial production of the resin powder having the above average roundness is facilitated. It is to be noted that the viscosity-average degree of polymerization is a value determined according to JIS K6726: 1994. Specifically, the viscosity-average degree of polymerization (P) can be determined by the following formula using a limiting viscosity [η] (L/g) determined in water at 30° C. for the PVA after being re-saponified to give the degree of saponification of 99.5 mol % or more and purified.

$$\text{Viscosity-average degree of polymerization} = ([\eta] \times 10^4/8.29)^{(1/0.62)}$$

The lower limit of an average particle diameter of the resin powder of the one embodiment of the present invention is typically 100 μm, and is preferably 150 μm, and more preferably 300 μm. When the average particle diameter is equal to or more than the lower limit, a dust explosion is less likely to occur, whereby safety can be improved. The upper limit of the average particle diameter is typically 2,000 μm, and is preferably 1,500 μm, more preferably 1,000 μm, and still more preferably 850 μm. When the average particle diameter is equal to or less than the upper limit, the flowability of the particles is enhanced, whereby the passability can be enhanced.

The average particle diameter of the resin powder is a value measured according to a method described in JIS K7369: 2009.

The average roundness (the average value PA of the roundness P of 50 particles arbitrarily extracted from the particles of the resin powder which have a particle diameter of 100 to 1,000 μm) is typically 0.1 or more, and is preferably 0.15 or more, more preferably 0.2 or more, still more preferably more than 0.2, and particularly preferably 0.22 or more, and may be extremely preferably 0.25 or more. When the average roundness is equal to or more than the lower limit, the flowability of the particles is enhanced, whereby the passability can be enhanced. On the other hand, the average roundness is typically 0.8 or less, and is preferably 0.7 or less. When the average roundness is equal to or less than the upper limit, productivity of the resin powder of the one embodiment of the present invention can be enhanced. Furthermore, the resin powder in which the average roundness is equal to or less than the upper limit can be effectively produced by a production method in which grinding and surface processing are performed.

The average roundness of the resin powder can be determined by the following method. Fifty particles are arbitrarily extracted from the particles of the resin powder which have a particle diameter of 100 to 1,000 μm (specifically, a particle diameter of 106 to 1,000 μm). In the sieving, the particles which have the particle diameter of 100 to 1,000 μm can be sorted out as particles which passed through a sieve screen (16 mesh) which has a nominal mesh opening size of 1,000 μm, and did not pass through a sieve screen which has a nominal mesh opening size of 106 m (150 mesh). The mechanical sieving can be performed, for example, by a method described in JIS K7369: 2009. With regard to one particle of the 50 particles arbitrarily extracted, with respect to a projection drawing with a maximum apparent area, eight corners in increasing order from a smallest radius of curvature r; (in a case in which there are less than 8 corners, all of the corners) are extracted, and the radius of curvature $r_i$ of each corner is measured. Furthermore, based on the projection drawing with the maximum apparent area, a radius R of a maximum inscribed circle of the particle is measured. The number of corners of the particle is defined as N (in a case in which the number of sides of the particle is 9 or more, N is set to 8), and based on the $r_i$ and R which have been measured, the roundness P of the one particle is determined by the following formula (1). A case in which the roundness P is low indicates that the particle has many angular corners, and a case in which the roundness P is high indicates that the particle is rounded.

$$P = \left(\sum_{i=1}^{N} r_i\right) / NR \quad (1)$$

The roundness P is calculated for the 50 particles which have been extracted, and an average value PA of the roundness P of these 50 particles is determined. This average value PA is the average roundness.

In the resin powder of the one embodiment of the present invention, a percentage content of the particles which have the particle diameter of 100 to 1,000 μm (specifically, the particle diameter of 106 to 1,000 μm) is not particularly limited, and is preferably 50% by mass or more, more preferably 55% by mass or more, and still more preferably 60% by mass or more. On the other hand, the upper limit of the percentage content of the particles which have the particle diameter of 100 to 1,000 μm may be 100% by mass. When the percentage content of the particles which have the particle diameter of 100 to 1,000 μm is within the above range, the passability is further enhanced. The percentage content of the particles which have the particle diameter of 100 to 1,000 μm can be determined by using the sieve screen having the nominal mesh opening size of 1,000 μm (16 mesh) and the sieve screen having the nominal mesh opening size of 106 km (150 mesh), and following a method described in JIS K7369: 2009.

The resin powder of the one embodiment of the present invention preferably satisfies the following inequality (2), and more preferably satisfies the following inequality (2) and has an average particle diameter of 100 to 1,000 km. In such a case, the passability can be enhanced particularly in an environment having high humidity. According to the studies performed by the present inventors, there is a tendency for the passability to increase as the average roundness increases. On the other hand, particularly in high humidity, a resin powder containing a PVA having a low degree of saponification tends to have low passability, perhaps due to hygroscopicity and/or the like. Thus, adopting a predetermined value or more as a product (PA×S) of the average value PA (the average roundness) of the roundness P and the degree of saponification S of the PVA enables achieving favorable passability even in high humidity.

$$PA \times S \geq 18 \quad (2)$$

In the inequality (2), PA represents the average value of the roundness P; and S represents the degree of saponification (mol %) of the PVA.

The product (PA×S) of the average value PA (the average roundness) of the roundness P and the degree of saponification S of the PVA is preferably 19 mol % or more, and more preferably 20 mol % or more. On the other hand, the upper limit of the product (PA×S) may be, for example, 80 mol %, or may be 60 mol %.

An angle of repose measured after the resin powder of the one embodiment of the present invention was subjected to moisture conditioning for one week in an atmosphere of 20° C. and 30% RH (relative humidity) is preferably less than 38°, and more preferably less than 35°. Furthermore, the angle of repose measured after the resin powder of the one embodiment of the present invention was conditioned for one week in an atmosphere of 20° C. and 65% RH is preferably less than 40°, and more preferably less than 38°. When the angle of repose of the resin powder of the one embodiment of the present invention is small in this way, superior passability can be achieved, even in an environment having high humidity. It is to be noted that the lower limit for these angles of repose may be, for example, 25°, or may be 30°. The angles of repose of the resin powder are values measured according to a method described in JIS 9301-2-2: 1999.

The resin powder of the one embodiment of the present invention can be used for a variety of intended usages. These intended usages are exemplified below, but are not limited thereto.

(1) Vinyl chloride dispersant usages: dispersion stabilizers and dispersion aids for suspension polymerization of vinyl chloride or vinylidene chloride (2) Coating agent usages: sizing agents, fiber processing agents, leather finishers, paints, anti-fogging agents, metal corrosion inhibitors, gloss agents for galvanized substance (s), and antistatic agents (3) Adhesive/binder usages: adhesives, agglutinants, remoistenable adhesives, various binders, and additives for cements, mortars, etc.

(4) Dispersion stabilizer usages: dispersion stabilizers for organic/inorganic pigments for paints, adhesives, etc., dispersion stabilizers for emulsion polymerization of various vinyl compounds, and post emulsifiers for bitumen, etc.

(5) Paper processing usages: paper strengthening agents, agents for imparting oil resistance/solvent resistance, smoothness-improving agents, surface gloss-improving aids, wood fillers, barrier agents, agents for imparting light resistance, water-proofing agents, dye/developer dispersants, adhesiveness improving agents, and binders (6) Agricultural usages: binders for pesticides, spreaders for pesticides, agricultural coating materials, soil improving agents, erosion inhibitors, and dispersants for pesticides (7) Medical/cosmetic usages: granulation binders, coating agents, emulsifying agents, skin patches, binding agents, bases for film formulations, and film-forming agents (8) Viscosity adjusting agent usages: thickening agents and rheology-adjusting agents (9) Aggregating agent usages: agents for aggregating solids suspended in water and for dissolved matter, and metal aggregating agents

(10) Film usages: water-soluble films, polarized films, barrier films, films for wrapping textile products, seed germination sheets, vegetation sheets, seed tapes, and hygroscopic films

(11) Molded article usages: fibers, pipes, tubes, anti-leak films, water-soluble fibers for chemical laces, and sponges

(12) Usages as raw materials for resins: raw materials for polyvinyl butyral, raw materials for photosensitive resins, raw materials for graft polymers, and raw materials for various gels

(13) Post-reaction usages: post-reaction usages with low-molecular organic compounds, high-molecular organic compounds, or inorganic compounds Method for Producing Resin Powder A method for producing a resin powder of an other embodiment of the present invention is not particularly limited, and the following method is preferred. More specifically, the method for producing a resin powder of the other embodiment of the present invention includes:

a step (step B) of grinding a resin solid containing a PVA to obtain a coarse powder, and a step (step C) of processing surfaces of the coarse powder.

The method for producing a resin powder of the other embodiment of the present invention may further comprise a step (step A) of synthesizing a PVA to obtain a resin solid containing the PVA.

Step A

Step A may include, for example, a polymerizing step, a saponifying step, and/or the like.

In the polymerizing step, a vinyl ester monomer is polymerized to give a vinyl ester polymer. The procedure of polymerizing the vinyl ester monomer is exemplified by a well-known procedure such as a bulk polymerization procedure, a solution polymerization procedure, a suspension polymerization procedure, an emulsion polymerization procedure, and the like. Of these procedures, the bulk polymerization procedure performed without a solvent and the solution polymerization procedure performed with a solvent such as an alcohol or the like are preferred, and the solution polymerization procedure in which the polymerization is performed in the presence of a lower alcohol is more preferred. The lower alcohol is preferably an alcohol having 3 or fewer carbon atoms; more preferably methanol, ethanol, n-propanol, or isopropanol; and still more preferably methanol. In carrying out a polymerization reaction by the bulk polymerization procedure or the solution polymerization procedure, in terms of a reaction system, either of a batch-wise system or a continuous system can be employed.

Examples of the vinyl ester monomer include vinyl formate, vinyl acetate, vinyl propionate, vinyl valerate, vinyl caprate, vinyl laurate, vinyl stearate, vinyl benzoate, vinyl pivalate, vinyl versatate, and the like. Of these, vinyl acetate is preferred.

An initiator to be used in the polymerization reaction is exemplified by well-known initiators, e.g., azo initiators such as 2,2'-azobisisobutyronitrile, 2,2'-azobis(2,4-dimethylvaleronitrile), and 2,2'-azobis(4-methoxy-2,4-dimethylvaleronitrile); organic peroxide initiators such as benzoyl peroxide and n-propyl peroxycarbonate; and the like. A polymerization temperature at a time of conducting the polymerization reaction is not particularly limited, and a range of 5° C. or higher and 200° C. or lower is appropriate.

In polymerizing the vinyl ester monomer, copolymerizable monomer(s) can be further copolymerized within a range not impairing the principles of the present invention. In the polymerization of the vinyl ester monomer, a chain transfer agent may also be present for the purpose of adjusting a degree of polymerization of the resulting PVA. Examples of the chain transfer agent include: aldehydes such as acetaldehyde, propionaldehyde, butyraldehyde, and benzaldehyde; ketones such as acetone, methyl ethyl ketone, hexanone, and cyclohexanone; mercaptans such as 2-hydroxyethanethiol; thiocarboxylic acids such as thioacetic acid; halogenated hydrocarbons such as trichloroethylene and perchloroethylene; and the like. Of these, the aldehydes and the ketones are particularly suitably used. An amount of the chain transfer agent to be added is determined according to the chain transfer constant of the chain transfer agent to be added and the target degree of polymerization of the PVA. Typically, the amount is preferably 0.1 to 10% by mass with respect to the vinyl ester to be used.

In the saponifying step, the vinyl ester polymer is saponified in an alcohol solution using an alkali catalyst or an acid catalyst to obtain the PVA. For the saponification reaction of the vinyl ester polymer, an alcoholysis or hydrolysis reaction using a conventionally well-known basic catalyst such as sodium hydroxide, potassium hydroxide, or sodium methoxide, or an acid catalyst such as p-toluenesulfonic acid can be adopted. Examples of the solvent to be used in the saponification reaction include: alcohols such as methanol and ethanol; esters such as methyl acetate and ethyl acetate; ketones such as acetone and methyl ethyl ketone; aromatic hydrocarbons such as benzene and toluene; and the like. These can be used alone, or in a combination of two or more types thereof. Of these, due to convenience, it is preferable to use methanol or a mixed solution of methanol and methyl acetate as the solvent, and to conduct the saponification reaction in the presence of sodium hydroxide which serves as the basic catalyst.

The saponifying step can be conducted using a belt type reactor, a kneader type reactor, a tower type reactor, or the like. By going through the saponifying step, the resin solid containing the PVA is obtained. A proportion of nonvolatile components in the resin solid accounted for by the PVA is, for example, typically 50% by mass or more, preferably 70% by mass or more, more preferably 90% by mass or more, and still more preferably 99% by mass or more. With regard to the nonvolatile components in the resin solid, the PVA may be substantially the principal component, and/or impurities such as sodium acetate, byproducts, and the like may be contained.

Step B

In Step B, the resin solid containing the PVA is ground. By this step, a coarse powder containing the PVA is obtained. The grinding may be performed using a well-known grinder. With regard to the grinder, a device which enables controlling an extent of the grinding, e.g., grinding strength, is preferred in order to adjust the average particle diameter and the like of the coarse powder to be obtained and the resin powder to be finally obtained. Other than adjusting the grinding strength, the average particle diameter and the like of the coarse powder to be obtained can also be adjusted by a processing time period and the like. It is to be noted that the coarse powder obtained may be subjected to a re-saponifying treatment. Furthermore, the coarse powder obtained may be subjected to: a washing treatment for reducing impurities such as sodium acetate, byproducts, and the like; a drying treatment for reducing volatile components; and the like. The resin solid before grinding may be subjected to the washing treatment and/or the drying treatment.

Step C In Step C, the surfaces of the coarse powder are processed. In the case in which the resin solid containing the PVA was ground, the coarse powder obtained will have a form in which the corners are very angular. Thus, by Step C, the corners are rounded, whereby a resin powder in which the average roundness is within a predetermined range can be efficiently obtained.

A device to be used in Step C is not particularly limited as long as polishing the surface of the coarse powder is enabled, and the device may be exemplified by: a rotary kiln in which a filling container for the powder rotates and surface polishing advances due to particles of the powder coming in contact with each other; a planetary mixer which enables subjecting contents to three-dimensional motion by screw blades which rotate and revolve within the container; a mixer in which paddles or screws within a container rotate and an internal powder is polished by the revolution; and the like. Examples of the mixer include a high-speed mixer, a Henschel mixer, a turbulizer, a Lödige mixer, and the like. Of these, in light of processing efficiency, the mixer is preferred, and the turbulizer or the Lödige mixer is more preferred. Furthermore, in Step C, the surface processing of the coarse powder may be performed while heating.

With regard to the method of producing a resin powder of the other embodiment of the present invention, in addition to the above-described steps, for example, a sieving step for adjusting the average particle diameter may be provided. Furthermore, after Step C, a washing treatment and/or a drying treatment may be performed.

EXAMPLES

Hereinafter, the present invention is explained in detail by way of Examples, but the present invention is not in any way limited to these Examples. It is to be noted that in the following Examples and Comparative Examples, each evaluation method adopted is indicated below.

[Viscosity-Average Degree of Polymerization of PVA]

The viscosity-average degree of polymerization of each PVA was determined according to JIS K6726: 1994. Specifically, in a case of the PVA having a degree of saponification of less than 99.5 mol %, the viscosity-average degree of polymerization was determined by the following formula using a limiting viscosity $[\eta]$ (L/g) measured in water at 30° C. for the PVA obtained after being saponified to give the degree of saponification of 99.5 mol % or more.

$$\text{Viscosity-average degree of polymerization} = ([\eta] \times 10^4/8.29)^{(1/0.62)}$$

[Degree of Saponification of PVA]

The degree of saponification of each PVA (including modified PVAs) was determined according to a method described in JIS K6726: 1994.

[Average Particle Diameter of Resin Powder and Percentage Content of Particles Having Particle Diameter of 100 to 1,000 μm]

Using a JIS standard sieve, the average particle diameter of the resin powder and the percentage content of particles which have a particle diameter of 100 to 1,000 μm (specifically a particle diameter of 106 to 1,000 μm) were determined by a method described in JIS K7369: 2009.

[Average Roundness of Resin Powder]

By the above-described sieving, particles which have the particle diameter of 100 to 1,000 μm (specifically the particle diameter of 106 to 1,000 μm) were sorted out, and 50 particles were arbitrarily extracted from these particles. With respect to each of these particles, a radius of curvature $r_i$ and a radius of a maximum inscribed circle R were determined based on an image with an enlargement ratio of 100 times using "VHX-900," a digital microscope available from Keyence Corporation, and a roundness P was determined for each particle. An average value PA of the roundness P of the 50 particles was determined, and was defined as the average roundness.

[Angle of Repose of Resin Powder]

The resin powder was subjected to moisture conditioning for one week in an atmosphere of 20° C. and 30% RH or 20° C. and 65% RH. Thereafter, the angle of repose of the resin powder was measured using "MT-1001," a multitester available from Seishin Co., Ltd. The angle of repose was measured in accordance with a method described in JIS 9301-2-2: 1999. It is to be noted that the present inventors have confirmed that a smaller angle of repose of the resin powder results in the passability through pipes and silos being more superior.

Example 1: Production of Resin Powder 1 of PVA 1

Into a 250 L reaction vessel equipped with a stirrer, a reflux condenser, a nitrogen inlet tube, and an addition port for an initiator were charged 112.5 kg of vinyl acetate and 37.5 kg of methanol (75% by mass vinyl acetate: 25% by mass methanol), and replacement with nitrogen in the system was carried out for 30 min while bubbling nitrogen. Elevation of the temperature of the reaction vessel was started, and 35 g of 2,2'-azobisisobutyronitrile (AIBN) was added to initiate the polymerization when an internal temperature of 60° C. was attained. When a degree of polymerization reached 50%, cooling was performed to stop the polymerization. A solid content concentration at the time of stopping the polymerization was 37.0% by mass. Subsequently, unreacted vinyl acetate monomer was eliminated while adding methanol at 30° C. under reduced pressure at intervals to obtain a methanol solution of polyvinyl acetate (PVAc) (concentration: 35%). Furthermore, 1.86 kg of an alkali solution (10% by mass sodium hydroxide in methanol solution) was added to 54.05 kg of a methanol solution of PVAc prepared by adding methanol (20 kg of PVAc in the solution) to the solution thus obtained, and saponification was carried out (a PVAc concentration in the saponification solution was 30%, and a molar ratio of sodium hydroxide to the vinyl acetate units in the PVAc was 0.02). Gelatinous matter (a resin solid) was produced about 1 min after the alkali solution was added, and then the gelatinous matter was ground with a grinder. The ground matter was left to stand at 40° C. for 1 hour to allow saponification to proceed, and then 50 kg of methyl acetate was added thereto to neutralize remaining alkali. After confirming the completion of neutralization using a phenolphthalein indicator, the mixture was filtered to obtain a white solid, 200 kg of methanol was added thereto, and the solution was left to stand at room temperature for 3 hrs to permit washing. After this washing operation was repeated three times, a white solid obtained by deliquoring through centrifugation was left to stand in a dryer at 65° C. for 2 days, whereby a coarse powder of PVA 1 was obtained. The degree of polymerization of PVA 1 was 1,700, and the degree of saponification was 98.5 mol %.

Next, the coarse powder of PVA 1 was charged into "FKM130D," a Lödige mixer equipped with a Becker shovel available from Chuo Kiko Co., Ltd. A surface processing treatment was performed for 3 hrs at a rotational speed of 160 rpm at room temperature in a nitrogen atmosphere, whereby a resin powder 1 was obtained having an average particle diameter of 650 μm and an average roundness of 0.25.

Examples 2 to 10 and 15 to 16

A resin powder 2 of PVA 2, and the like were obtained by operations similar to that of Example 1, except that the conditions were as described in Table 1.

Example 11

Into a 250 L reaction vessel equipped with a stirrer, a reflux condenser, a nitrogen inlet tube, a comonomer dripping port, and an addition port for an initiator were charged 120.0 kg of vinyl acetate and 30.0 kg of methanol (80% by mass vinyl acetate: 20% by mass methanol), and replacement with nitrogen in the system was carried out for 30 min while bubbling nitrogen. Elevation of the temperature of the reaction vessel was started, and 2.5 kg of acetaldehyde and 35 g of 2,2'-azobisisobutyronitrile (AIBN) were added to initiate the polymerization when an internal temperature of 60° C. was attained. When a degree of polymerization reached 50%, cooling was performed to stop the polymerization. A solid content concentration at the time of stopping the polymerization was 39.3% by mass. A resin powder 11 of PVA 11 was obtained by an operation similar to that of Example 1, except that the conditions were as described in Table 1 below.

Example 12

Polymerization and saponification were performed by methods similar to those of Example 2 disclosed in Japanese Unexamined Patent Application, Publication No. 2019-011282, whereby a coarse powder of an ethylene-modified PVA (PVA 12) having a degree of polymerization of 1,850, a degree of saponification of 98.5 mol %, and an ethylene unit content of 6 mol % was obtained. A resin powder 12 of PVA 12 was obtained by an operation similar to that of Example 1, except that the conditions were as described in Table 1 below.

Example 13

Into a 250 L reaction vessel equipped with a stirrer, a reflux condenser, a nitrogen inlet tube, a comonomer dripping port, and an addition port for an initiator were charged 112.5 kg of vinyl acetate, 37.5 kg of methanol (75% by mass vinyl acetate: 25% by mass methanol), and 220 ml of a methanol solution in which methyl methacrylate was dissolved to account for 24% by mass, and replacement with nitrogen in the system was carried out for 30 minutes while bubbling nitrogen. Elevation of the temperature of the reaction vessel was started, and 25 g of 2,2'-azobisisobutyronitrile (AIBN) was added to initiate the polymerization when an internal temperature of 60° C. was attained. Then, polymerization was allowed while sequentially charging 11 L of the methanol solution of methyl methacrylate into a thus obtained solution, and cooling was performed when the degree of polymerization reached 40% to stop the polymerization. A solid content concentration at the time of stopping the polymerization was 28.0% by mass. A resin powder 13 of PVA 13 was obtained by an operation similar to that of Example 1, except that the conditions were as described in Table 1 below.

Example 14

A resin powder 14 of PVA 14 was obtained by an operation similar to that of Example 2, except that the grinding by the grinder was performed more coarsely than in Example 2.

Examples 17 to 19

A resin powder 17 of PVA 17, and the like were obtained by an operation similar to that of Example 2, except that the surface processing treatment was performed with the device disclosed in Table 1 instead of the Lödige mixer.

Comparative Example 1

A resin powder 1' of PVA 1' was obtained by an operation similar to that of Example 2, except that the grinding by the grinder was performed still more coarsely than in Example 14.

Comparative Example 2

A resin powder 2' of PVA 2' was obtained by an operation similar to that of Example 2, except that the surface processing treatment by the Lödige mixer was not performed.

The degree of polymerization and the degree of saponification of each PVA obtained in Examples 1 to 19 and Comparative Examples 1 and 2, as well as, with regard to each resin powder obtained therefrom, the average roundness, the average particle diameter, the percentage content of particles which have the particle diameter of 100 to 1,000 μm, and the product of the average roundness and the degree of saponification are shown in Table 2.

Evaluations

With regard to each resin powder obtained from Examples 1 to 19 and Comparative Examples 1 and 2, the angle of repose was measured by the above-described method after conditioning in an atmosphere of 20° C. and 30% RH and an atmosphere of 20° C. and 65% RH. The measurement results are shown in Table 2.

TABLE 1

| | Polymerization conditions | | | | Saponification conditions PVAc | | Surface processing treatment | | Produced material | |
|---|---|---|---|---|---|---|---|---|---|---|
| | vinyl acetate | methanol | | degree of polymerization | concentration | NaOH molar | | processing time | | |
| | % by mass | % by mass | comonomer type | % | % by mass | ratio | device | period hrs | PVA | resin powder |
| Example 1 | 75 | 25 | — | 50 | 30 | 0.02 | Lödige mixer | 3 | PVA 1 | resin powder 1 |
| Example 2 | 75 | 25 | — | 50 | 30 | 0.008 | Lödige mixer | 3 | PVA 2 | resin powder 2 |
| Example 3 | 75 | 25 | — | 50 | 30 | 0.005 | Lödige mixer | 3 | PVA 3 | resin powder 3 |
| Example 4 | 75 | 25 | — | 50 | 30 | 0.003 | Lödige mixer | 3 | PVA 4 | resin powder 4 |
| Example 5 | 75 | 25 | — | 50 | 30 | 0.001 | Lödige mixer | 3 | PVA 5 | resin powder 5 |
| Example 6 | 75 | 25 | — | 50 | 30 | 0.001 | Lödige mixer | 8 | PVA 6 | resin powder 6 |
| Example 7 | 85 | 15 | — | 40 | 30 | 0.02 | Lödige mixer | 3 | PVA 7 | resin powder 7 |
| Example 8 | 90 | 10 | — | 25 | 30 | 0.02 | Lödige mixer | 3 | PVA 8 | resin powder 8 |
| Example 9 | 100 | 0 | — | 25 | 30 | 0.02 | Lödige mixer | 3 | PVA 9 | resin powder 9 |
| Example 10 | 100 | 0 | — | 5 | 30 | 0.02 | Lödige mixer | 3 | PVA 10 | resin powder 10 |
| Example 11 (*1) | 80 | 20 | — | 50 | 30 | 0.005 | Lödige mixer | 4 | PVA 11 | resin powder 11 |
| Example 12 | 88 | 12 | ethylene | 20 | 25 | 0.08 | Lödige mixer | 3 | PVA 12 | resin powder 12 |
| Example 13 | 75 | 25 | methyl methacrylate | 40 | 30 | 0.10 | Lödige mixer | 3 | PVA 13 | resin powder 13 |
| Example 14 (*2) | 75 | 25 | — | 50 | 30 | 0.008 | Lödige mixer | 3 | PVA 14 | resin powder 14 |
| Example 15 | 75 | 25 | — | 50 | 30 | 0.008 | Lödige mixer | 5 | PVA 15 | resin powder 15 |
| Example 16 | 75 | 25 | — | 50 | 30 | 0.008 | Lödige mixer | 1 | PVA 16 | resin powder 16 |
| Example 17 | 75 | 25 | — | 50 | 30 | 0.008 | Pam Apex mixer | 3 | PVA 17 | resin powder 17 |
| Example 18 | 75 | 25 | — | 50 | 30 | 0.008 | Henschel mixer | 5 | PVA 18 | resin powder 18 |
| Example 19 | 75 | 25 | — | 50 | 30 | 0.008 | ribbon mixer | 5 | PVA 19 | resin powder 19 |
| Comparative Example 1 (*3) | 75 | 25 | — | 50 | 30 | 0.008 | Lödige mixer | 3 | PVA 1' | resin powder 1' |
| Comparative Example 2 | 75 | 25 | — | 50 | 30 | 0.008 | Lödige mixer | 0 | PVA 2' | resin powder 2' |

(*1): Acetaldehyde was used as a chain transfer agent.
(*2): Grinding was performed more coarsely than in Example 2.
(*3): Grinding was performed still more coarsely than in Example 14.

TABLE 2

| | | PVA | | | Resin powder | | | Average roundness × degree of saponification mol % | Angle of repose | |
|---|---|---|---|---|---|---|---|---|---|---|
| | | type | degree of polymerization | degree of saponification mol % | comonomer content | average roundness | average particle diameter μm | percentage content (*1) % by mass | 30% RH ° | 65% RH ° |
| Example 1 | resin powder 1 | PVA 1 | 1700 | 98.5 | — | 0.25 | 650 | 90 | 24.6 | 34 | 36 |
| Example 2 | resin powder 2 | PVA 2 | 1700 | 88.0 | — | 0.26 | 580 | 98 | 22.9 | 34 | 36 |
| Example 3 | resin powder 3 | PVA 3 | 1700 | 80.0 | — | 0.27 | 700 | 96 | 21.6 | 33 | 36 |
| Example 4 | resin powder 4 | PVA 4 | 1700 | 65.0 | — | 0.25 | 400 | 85 | 16.3 | 34 | 38 |
| Example 5 | resin powder 5 | PVA 5 | 1700 | 40.0 | — | 0.18 | 900 | 75 | 7.2 | 35 | 39 |
| Example 6 | resin powder 6 | PVA 6 | 1700 | 40.0 | — | 0.55 | 450 | 80 | 22.0 | 33 | 37 |
| Example 7 | resin powder 7 | PVA 7 | 2400 | 98.5 | — | 0.24 | 620 | 92 | 23.6 | 32 | 33 |
| Example 8 | resin powder 8 | PVA 8 | 3200 | 98.5 | — | 0.22 | 700 | 88 | 21.7 | 34 | 35 |
| Example 9 | resin powder 9 | PVA 9 | 4500 | 98.5 | — | 0.21 | 830 | 93 | 20.7 | 33 | 33 |
| Example 10 | resin powder 10 | PVA 10 | 5200 | 98.5 | — | 0.15 | 900 | 91 | 14.8 | 36 | 38 |
| Example 11 | resin powder 11 | PVA 11 | 800 | 72.0 | — | 0.41 | 650 | 92 | 29.5 | 33 | 37 |
| Example 12 | resin powder 12 | PVA 12 | 1850 | 98.5 | ethylene 6 mol % | 0.23 | 600 | 85 | 22.7 | 33 | 34 |
| Example 13 | resin powder 13 | PVA 13 | 1700 | 99.0 | methyl methacrylate 5 mol % | 0.25 | 590 | 87 | 24.8 | 34 | 36 |
| Example 14 | resin powder 14 | PVA 14 | 1700 | 88.0 | — | 0.32 | 1300 | 55 | 28.2 | 36 | 38 |
| Example 15 | resin powder 15 | PVA 15 | 1700 | 88.0 | — | 0.53 | 350 | 94 | 46.6 | 30 | 32 |
| Example 16 | resin powder 16 | PVA 16 | 1700 | 88.0 | — | 0.15 | 800 | 70 | 13.2 | 36 | 38 |
| Example 17 | resin powder 17 | PVA 17 | 1700 | 88.0 | — | 0.28 | 660 | 88 | 24.6 | 34 | 37 |
| Example 18 | resin powder 18 | PVA 18 | 1700 | 88.0 | — | 0.18 | 250 | 56 | 15.8 | 37 | 39 |
| Example 19 | resin powder 19 | PVA 19 | 1700 | 88.0 | — | 0.17 | 450 | 65 | 15.0 | 37 | 39 |
| Comparative Example 1 | resin powder 1' | PVA 1' | 1700 | 88.0 | — | 0.21 | 2300 | 35 | 18.5 | 38 | 40 |

TABLE 2-continued

| | | PVA | | | | Resin powder | | | Average roundness × degree of saponification mol % | Angle of repose | |
|---|---|---|---|---|---|---|---|---|---|---|---|
| | | type | degree of polymerization | degree of saponification mol % | comonomer content | average roundness | average particle diameter μm | percentage content (*1) % by mass | | 30% RH ° | 65% RH ° |
| Comparative Example 2 | resin powder 2' | PVA 2' | 1700 | 88.0 | — | 0.05 | 600 | 80 | 4.4 | 41 | 43 |

(*1): Percentage content of particles having particle diameter of 100 to 1,000 μm As shown in Table 2, each of the resin powders of Examples 1 to 19 had an angle of repose of less than 38° after the conditioning in the atmosphere of 30% RH and an angle of repose of less than 40° after the conditioning in the atmosphere of 65% RH. It was confirmed that the resin powders of Examples 1 to 19 had small angles of repose and were superior with regard to passability through tubes and silos. On the other hand, the resin powder of Comparative Example 1, which has a large average particle diameter, and the resin powder of Comparative Example 2, which has a small average roundness, had large angles of repose.

Furthermore, for example, when Examples 1 to 5 are compared, it is revealed that in the environment having high humidity, the degree of saponification of the PVA has a large influence on the angle of repose. Moreover, with regard to the resin powders of Examples 1 to 3, 6 to 9, 11 to 13, 15, and 17, in each of which the product of the average roundness and the degree of saponification was 18 mol % or more and the average particle diameter was 100 to 1,000 μm, the angle of repose after the conditioning in the atmosphere of 65% RH was less than 38°, revealing particularly superior passability even in high humidity.

INDUSTRIAL APPLICABILITY

The resin powder of the one embodiment of the present invention can be adopted for use in each of synthetic fiber materials, film materials, emulsification dispersants, adhesives, and the like.

The invention claimed is:

1. Particles, comprising:
a resin powder comprising a vinyl alcohol polymer,
wherein an average particle diameter of the particles is in a range of from 100 to 2,000 μm, and
wherein an average value PA of a roundness P, by formula (1), of 50 particles arbitrarily selected from the particles, the 50 particles having particle diameters in a range of from 100 to 1,000 μm, is in a range of from 0.1 to 0.8:

$$P = (\sum_{i=1}^{N} r_i)/NR \qquad (1),$$

wherein, in the formula (1),
$r_i$ is a curvature radius of each corner of an Nth particle of the 50 particles arbitrarily selected, corners being observed in a projection image of the 50 particles with a maximum apparent area observed at 100-fold enlargement on a digital microscope,
R is a maximum inscribed circle radius of the Nth particle, and
N is a number of the corners of the Nth particle,
wherein, when a number of the corners of the Nth particle is 9 or more, radii of curvature of eight corners, in increasing order from a smallest radius of curvature, are adopted, and N is set to 8.

2. The particles of claim 1, wherein the vinyl alcohol polymer has a viscosity-average degree of polymerization in a range of from 200 to 5,000, and
wherein the vinyl alcohol polymer has a degree of saponification in a range of from 35 to 99.99 mol %.

3. The particles of claim 1, wherein the average particle diameter is in a range of from 100 to 1,000 μm, and satisfying formula (2):

$$PA \times S \geq 18 \qquad (2),$$

wherein, in the formula (2), S is a degree of saponification (mol %) of the vinyl alcohol polymer.

4. The particles of claim 1, wherein a percentage content of particles which have a particle diameter of 100 to 1,000 μm is 50% by mass or more.

5. The particles of claim 1, wherein a percentage content of the particles having a particle diameter in a range of from 106 to 1,000 μm is 50% by mass or more.

6. The particles of claim 1, wherein a percentage content of the particles having a particle diameter in a range of from 106 to 1,000 μm is 55% by mass or more.

7. The particles of claim 1, wherein a percentage content of the particles having a particle diameter in a range of from 106 to 1,000 μm is 60% by mass or more.

8. The particles of claim 1, wherein a percentage content of the particles having a particle diameter in a range of from particle diameter of 100 to 1,000 μm is 100% by mass.

9. The particles of claim 1, wherein the vinyl alcohol polymer has a viscosity-average degree of polymerization in a range of from 250 to 4,500.

10. The particles of claim 1, wherein the vinyl alcohol polymer has a viscosity-average degree of polymerization in a range of from 400 to 4,500.

11. The particles of claim 1, wherein the vinyl alcohol polymer has a viscosity-average degree of polymerization in a range of from 600 to 3,000.

12. The particles of claim 1, wherein the vinyl alcohol polymer has a degree of saponification in a range of from 50 to 99.99 mol %.

13. The particles of claim 1, wherein the vinyl alcohol polymer has a degree of saponification in a range of from 70 to 99.99 mol %.

14. The particles of claim 1, wherein the vinyl alcohol polymer comprises, in reacted form, a further monomer in a range of from 0.1 to 20 mol. %.

15. A method for producing the particles of claim 1, the method comprising:
grinding a resin solid comprising the vinyl alcohol polymer to obtain a first powder having a form in which corners are angular; and
polishing surfaces of the first powder to obtain the resin powder.

16. A plurality of particles, the particles comprising:
a vinyl alcohol polymer,
wherein an average particle diameter of the plurality of the particles is in a range of from 100 to 2,000 μm, and
wherein an average value PA of a roundness P, by formula (1), of 50 particles arbitrarily extracted from the particles after passing through a 16 mesh sieve screen and retained by a 150 mesh sieve screen, is in a range of from 0.1 to 0.8:

$$P = (\Sigma_{i=1}^{N} r_i)/NR \tag{1},$$

wherein, in the formula (1),
$r_i$ is a curvature radius of each corner of an Nth particle of the 50 particles arbitrarily selected, corners being observed in a projection image of the 50 particles with a maximum apparent area observed at 100-fold enlargement on a digital microscope,
R is a maximum inscribed circle radius of the Nth particle; and
N is a number of the corners of the Nth particle,
wherein, when a number of the corners of the Nth particle is 9 or more, radii of curvature of eight corners, in increasing order from a smallest radius of curvature, are adopted, and N is set to 8.

17. The plurality of particles of claim 16, wherein the vinyl alcohol polymer has a viscosity-average degree of polymerization in a range of from 200 to 5,000, and
wherein the vinyl alcohol polymer has a degree of saponification in a range of from 35 to 99.99 mol %.

18. The plurality of particles of claim 16, wherein the average particle diameter is in a range of from 100 to 1,000 μm, and satisfies formula (2):

$$PA \times S \geq 18 \tag{2},$$

wherein, in the formula (2), S is a degree of saponification (mol %) of the vinyl alcohol polymer.

19. The plurality of particles of claim 16, wherein a percentage content of particles having a particle diameter in a range of from 100 to 1,000 μm is 50% by mass or more.

20. A method for producing the plurality of particles of claim 16, the method comprising:
grinding a resin solid comprising the vinyl alcohol polymer to obtain a first powder having a form in which corners are angular; and
polishing surfaces of the first powder to obtain the resin powder.

* * * * *